No. 816,510. PATENTED MAR. 27, 1906.
C. M. SPENCER.
AUTOMATIC SCREW MACHINE.
APPLICATION FILED MAY 4, 1904.

6 SHEETS—SHEET 1.

Witnesses:
Ethel M. Lowe.
Daniel Westin.

Inventor:
Christopher M. Spencer
by
Harry R. Williams
atty.

No. 816,510. PATENTED MAR. 27, 1906.
C. M. SPENCER.
AUTOMATIC SCREW MACHINE.
APPLICATION FILED MAY 4, 1904.

6 SHEETS—SHEET 3.

Witnesses:
Ethel M. Lowe.
Daniel Weston

Inventor:
Christopher M. Spencer
Harry R. Williams
atty.

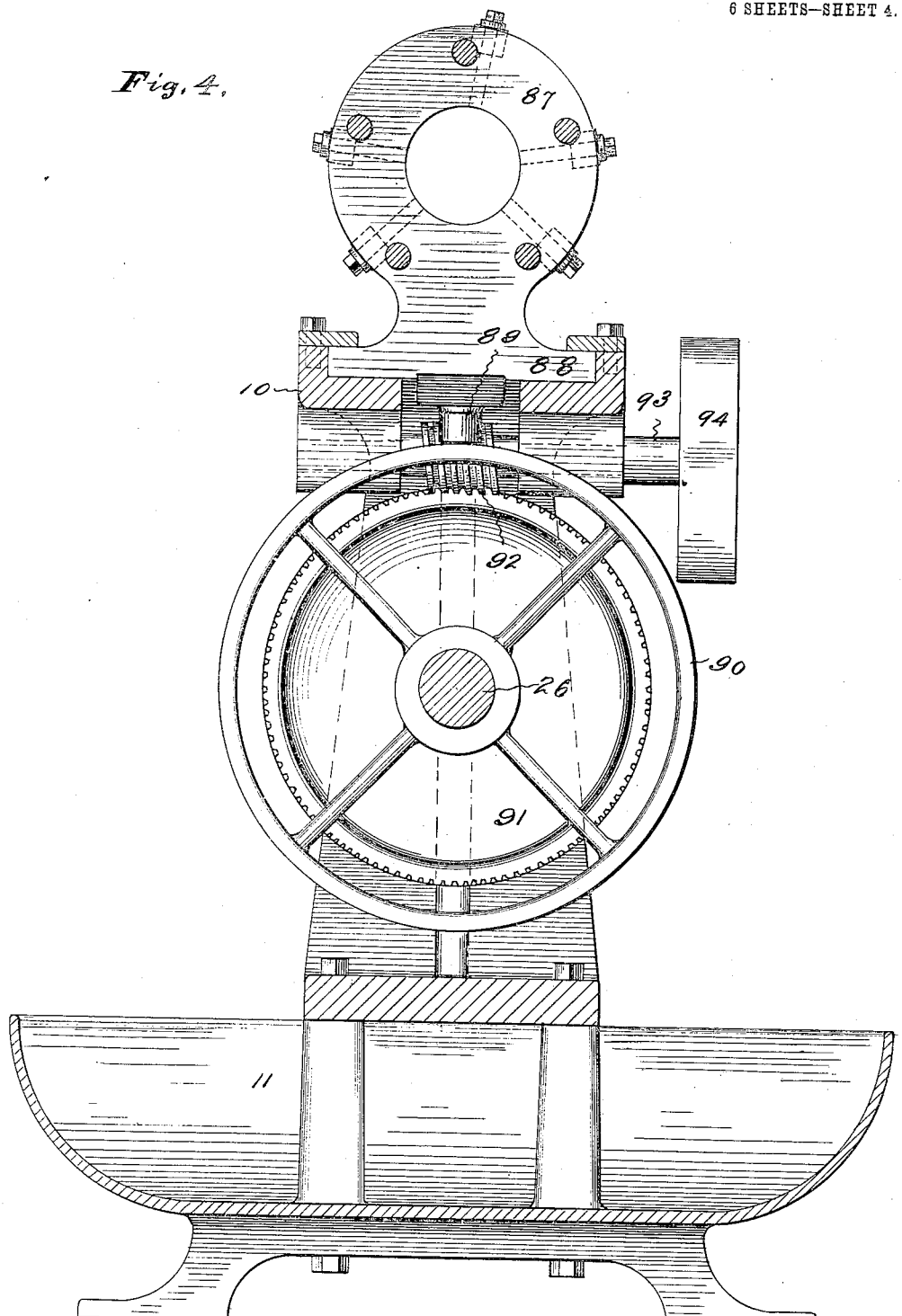

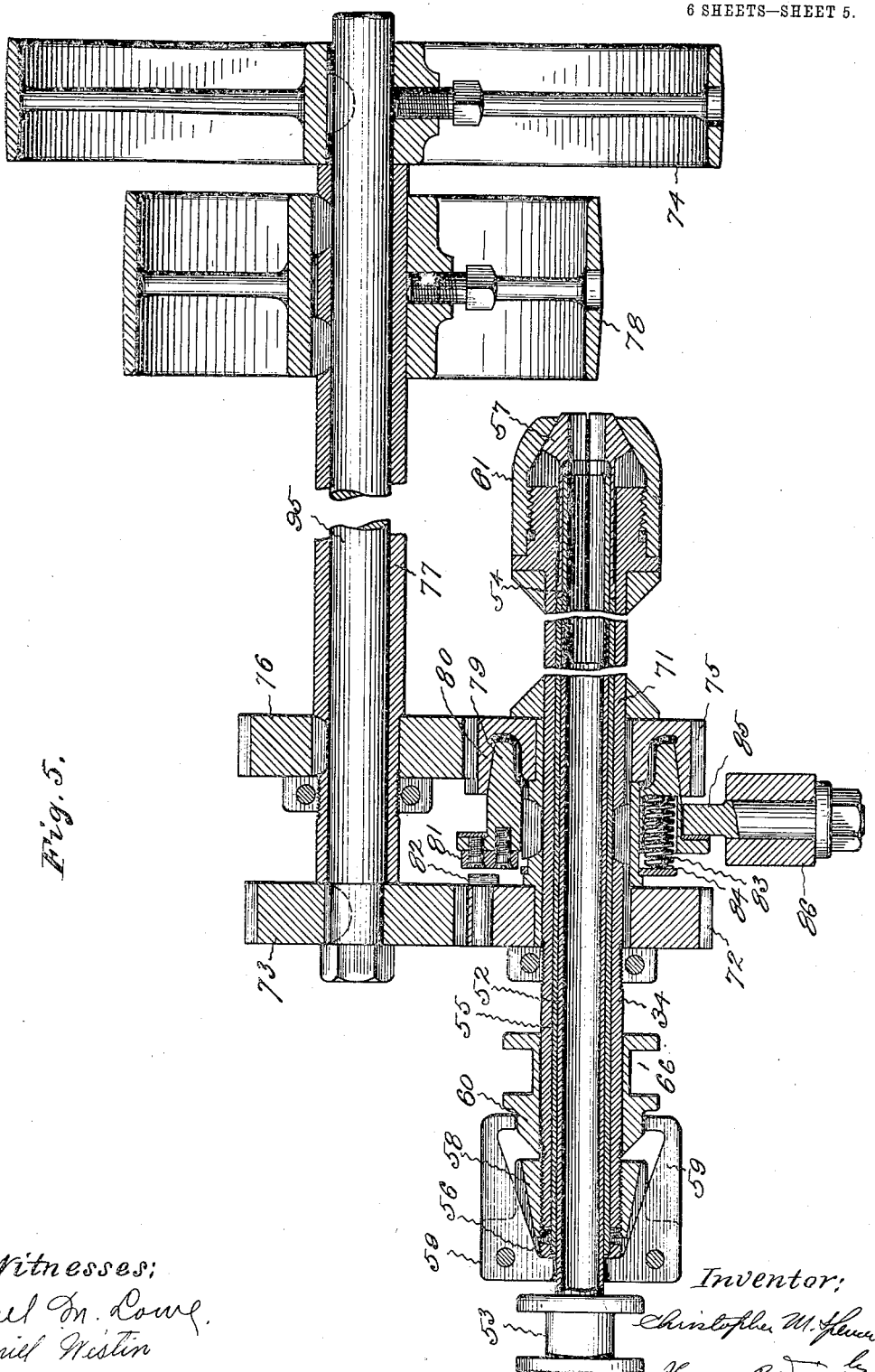

No. 816,510. PATENTED MAR. 27, 1906.
C. M. SPENCER.
AUTOMATIC SCREW MACHINE.
APPLICATION FILED MAY 4, 1904.
6 SHEETS—SHEET 6.
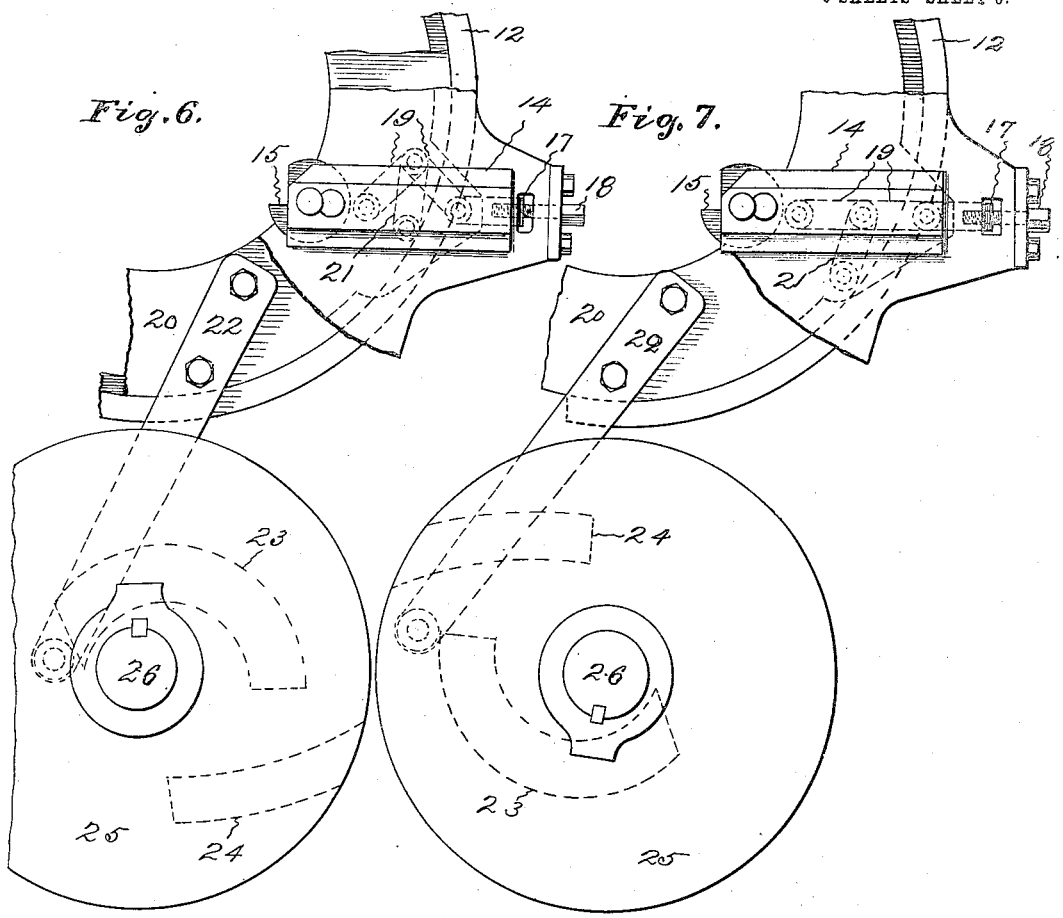
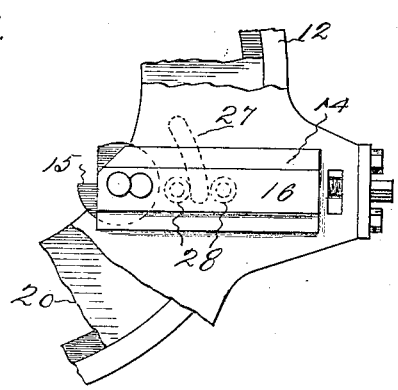
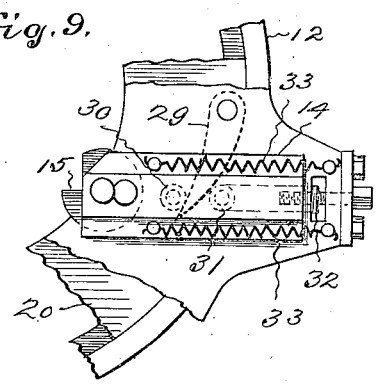
Witnesses:
Ethel M. Lowe.
Daniel Westin
Inventor:
Christopher M. Spencer,
Harry R. Williams
atty

UNITED STATES PATENT OFFICE.

CHRISTOPHER M. SPENCER, OF WINDSOR, CONNECTICUT, ASSIGNOR TO THE UNIVERSAL MACHINE SCREW COMPANY, OF HARTFORD, CONNECTICUT, A CORPORATION OF CONNECTICUT.

AUTOMATIC SCREW-MACHINE.

No. 816,510.  Specification of Letters Patent.  Patented March 27, 1906.

Application filed May 4, 1904. Serial No. 206,277.

*To all whom it may concern:*

Be it known that I, CHRISTOPHER M. SPENCER, a citizen of the United States, residing at Windsor, in the county of Hartford and State of Connecticut, have invented a new and useful Automatic Screw-Machine, of which the following is a specification.

This invention relates to an automatic multiple-spindle screw-machine which is constructed to feed a continuous length of rod through each spindle.

The object of the invention is to simplify the mechanism of the machine as a whole and to provide a simple and quick-acting mechanism which when each spindle reaches the proper location reverses that spindle for threading the rod and also to provide a tool-carrying head which is so arranged that all of the tools are simultaneously and uniformly moved toward and from rods carried by the several spindles by a single mechanism.

Figure 1:
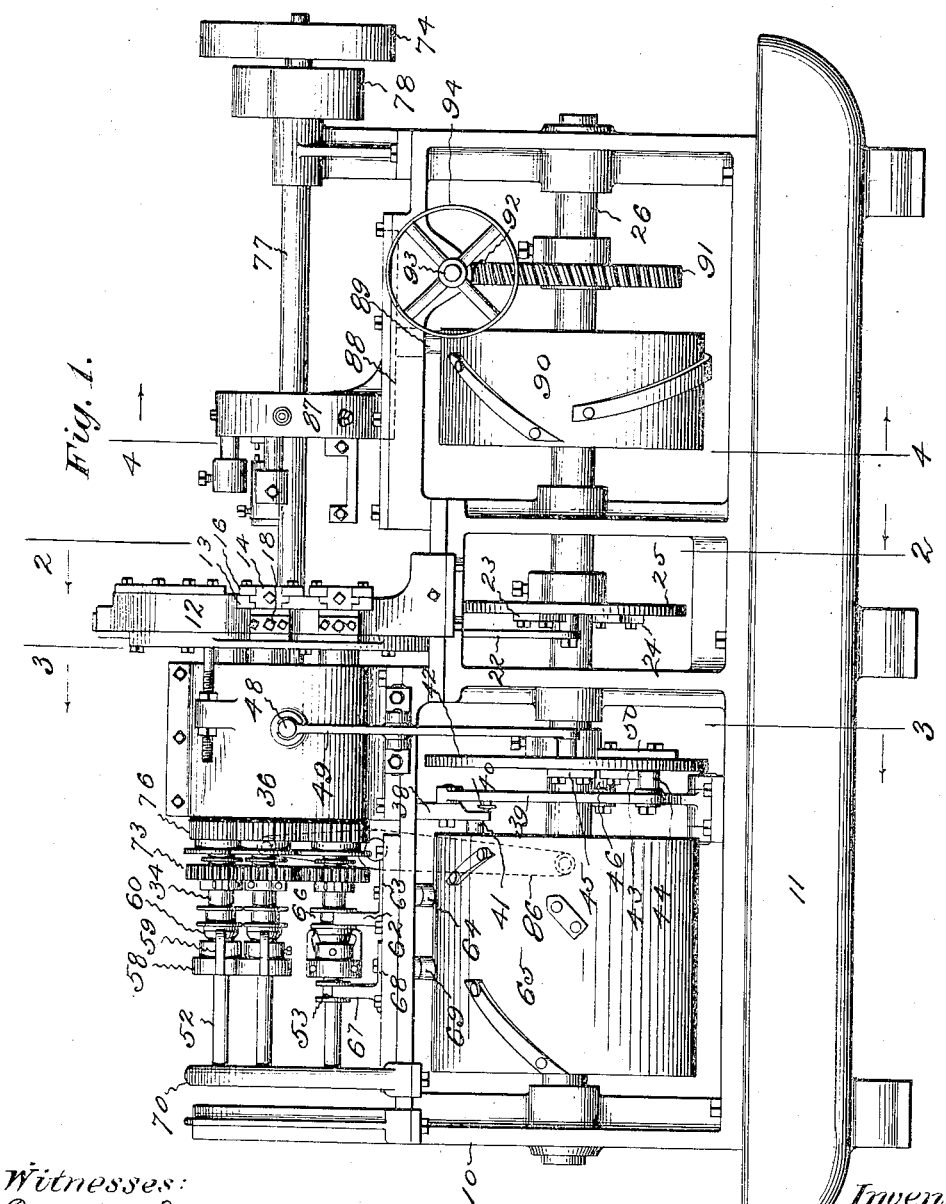
Figure 2:
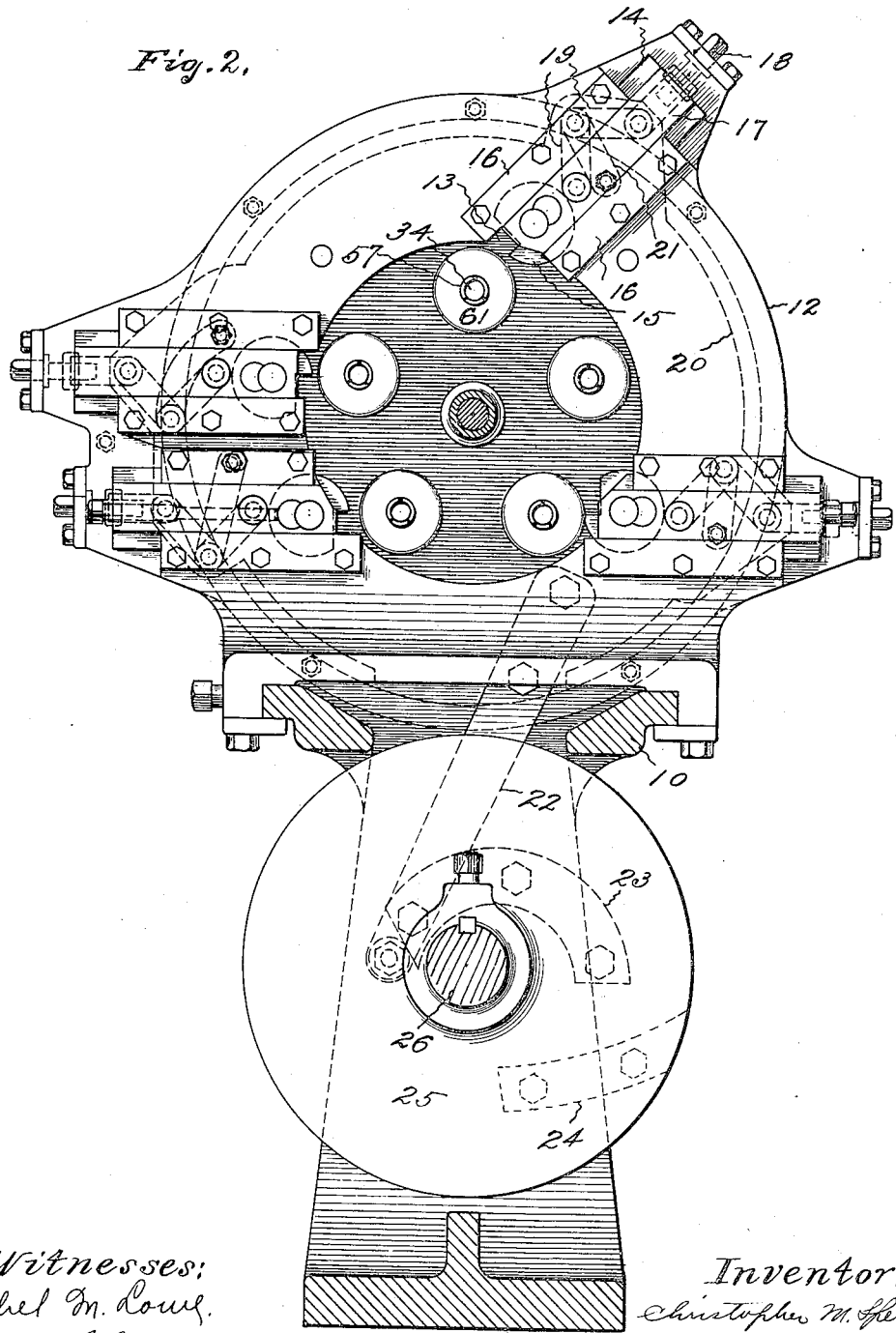
Figure 3:
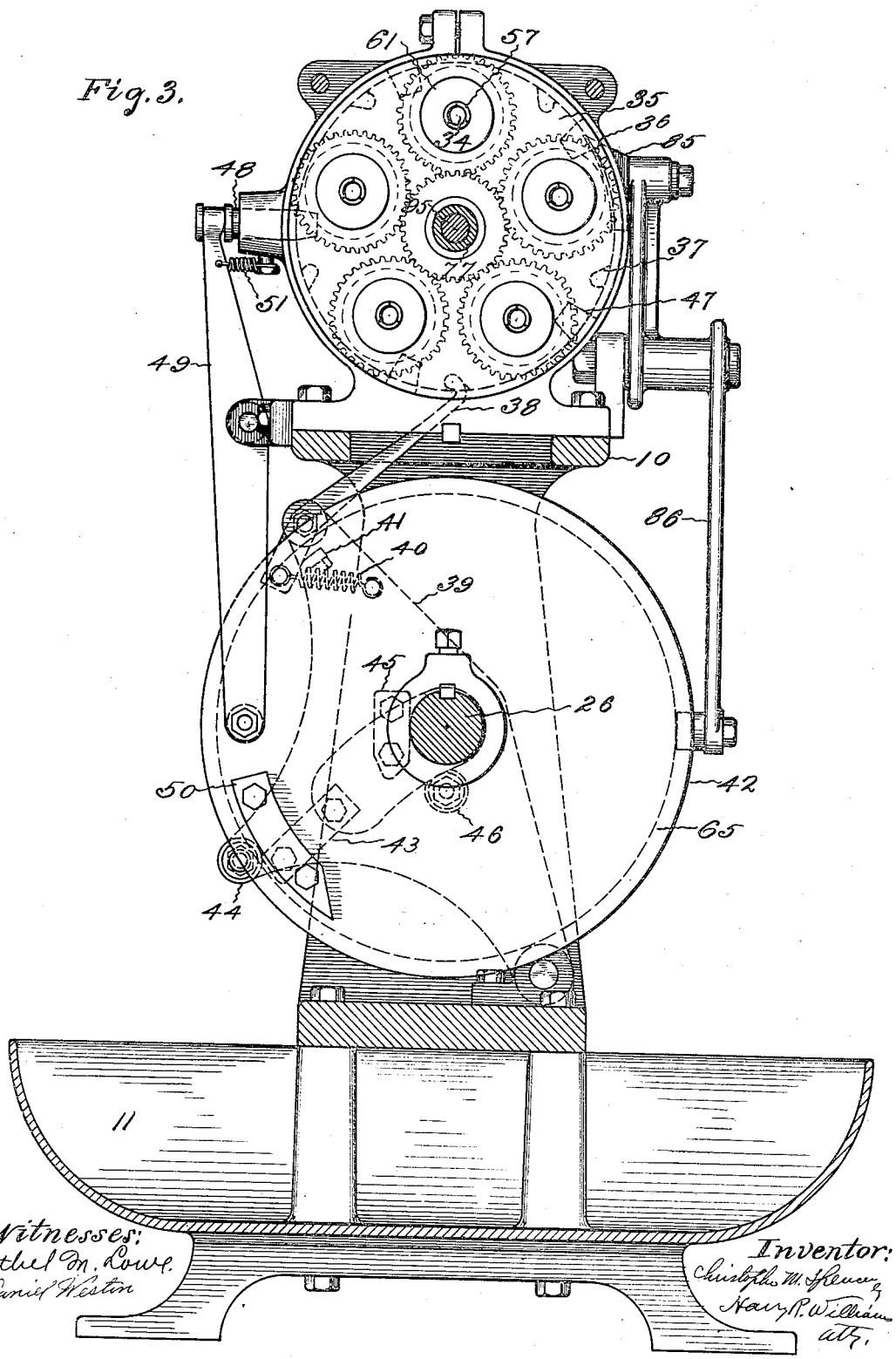

Figure 1 of the accompanying drawings shows a side elevation of the machine. Fig. 2 shows a vertical section taken on the plane indicated by 2 2 on Fig. 1. Fig. 3 shows a vertical section on the plane indicated by 3 3 on Fig. 1. Fig. 4 shows a vertical section on the plane indicated by the line 4 4 on Fig. 1. Fig. 5 shows a longitudinal section, on larger scale, of one spindle and the spindle-rotating mechanism. Fig. 6 shows a portion of the tool-head with one tool and the mechanism for feeding the tool. Fig. 7 shows a portion of the tool-head with the tool advanced. Fig. 8 shows a portion of the tool-head and one tool arranged to be fed by a modified mechanism, and Fig. 9 shows a portion of the tool-head and one tool arranged to be fed by a still different mechanism.

The frame 10 of the machine may be of any common form and construction and may be mounted on any suitable support, as the trough-shaped bed 11. Mounted on the top of the frame near the middle, so that it may be adjusted longitudinally, is the head 12, which supports the forming and cutting-off tools. On the face of this head are a number of ways 13, in each of which is a slide 14. Secured to each slide is a suitable tool 15. The gibs 16, which hold the slides in position, are so fastened in place that they may be taken off for removing the slides when desired, Figs. 1 and 2. In an opening in the head adjacent to each slide is a block 17, into which an adjusting-screw 18 is tapped. Each block is connected with the slide by a pair of toggle-links 19. Rotatably supported in the head back of the slides is an annular plate 20, which is connected with each toggle by a link 21, Fig. 2. An arm 22, fastened to the annular plate, which is connected with the toggles, projects downwardly into the path of the cams 23 and 24 on the cam-disk 25, that is mounted on the cam-shaft 26, that extends longitudinally of the machine and is supported by the frame in suitable bearings. The cam 23 engages a roll on the end of the arm and causes the annular plate to be given a rotary movement in such direction that the links straighten the toggles and feed the tools toward the rods to be cut, which extend through the spindles. The cam 24 engages the roll on the arm and causes the annular plate to be given a movement in the opposite direction, so that the links will bend the toggles and draw the tools back from the rods, Figs. 6 and 7. By means of the oscillatory movements of the annular plate all of the forming-tools, which may be roughening, finishing, nurling, and cutting-off tools, are simultaneously and uniformly by the same cam moved toward and from the rods which are held by the several spindles. By turning the adjusting-screws the adjusting-blocks, to which the outer ends of the toggle-links are attached, may be moved in and out in such manner that when the toggles are straightened the tools will be moved inwardly the exact distance required. It will be observed that by this toggle mechanism the tools move more and more slowly as they near the completion of their work, for the reason that as the toggles get nearer straight they advance the tools more slowly, which is particularly desirable with forming and cutting-off tools in order that the finishing cut may be made with but slight, if any, advance of the tool, so as to insure a smooth and accurate finish.

Instead of moving the slides forwardly and backwardly by means of a toggle cams 27 may be fastened to the face of the annular plate, which has a rotary movement in the head. A pair of rolls 28 may be mounted on the back of each slide, so as to embrace one of these cams. The rotary movement of the annular plate by means of these cams and rolls imparts a reciprocatory movement to the tool-carrying slides, Fig. 8.

If desired, a wedge 29 may be mounted on the annular plate in position to engage a roll 30 on the back of each slide, and a roll 31 may be mounted on the adjustable block 32 in position to force the slide forward when the plate is rotated. Springs 33 may be provided for drawing the slide back when it is adapted to be forced forward by a wedge, Fig. 9.

The tubular spindles 34, through which the rods are fed in the usual manner, are supported in a cylindrical spindle-head 35, that is rotatably mounted in an annular frame 36, fastened on the top of the main frame just back of the forming-tool head. In the periphery of the spindle-head are notches 37, corresponding to the number of spindles, and adapted to engage with these notches and at the proper times give the head a rotary movement is the end of a finger 38, which is pivotally mounted on a yoke 39, that is hinged to the bottom of the frame. A spring 40, connected between the arm and the yoke, tends to keep the pulling end of the finger in one of the notches in the periphery of the head, and a block 41 is arranged on the cam-drum 65, that is mounted on the cam-shaft, to open the finger from the notches at the proper time, Figs. 1 and 3. The yoke is adapted to be oscillated in one direction by the engagement of a cam 43 on the back of the disk 42 with a roll 44 on the yoke for causing the finger to advance the spindle-head, and it is adapted to be oscillated in the opposite direction by the engagement of a cam 45 on the same disk with a roll 46 on the yoke for drawing back the finger, so that it will engage the next notch in the periphery of the spindle-head, Fig. 3.

In the periphery of the spindle-head are sockets 47, corresponding to the number of the notches. Movable in one side of the spindle-head frame is a bolt 48, that is adapted to enter the sockets for the purpose of centering the spindle-head and securing it in exact position when it is stationary. The outer end of the bolt is connected with a lever 49, that is pivoted to the side of the frame and is adapted to be swung so as to draw the bolt out from a socket in the head by a cam 50 on the face of the disk 42. A spring 51 is arranged to cause the lever to force the bolt into a socket. The spindle-head frame is split at the top, so that it may be drawn together more or less for the purpose of properly holding the head and taking up wear, Fig. 3.

Each spindle contains a feed-tube 52, with a flanged collar 53 at one end and a hardened split collet 54, which is adapted to grip the rod and carry it forward, at the other end. Outside of the feed-tube is a chucking-tube 55, which at the rear end has a hardened collar 56 and at the front end butts against the end of the shank of the holding-chuck 57. Screwed onto the rear end of the spindle is a block 58, carrying a pair of levers 59, the inner ends of which butt against the collar on the end of the chucking-tube, while the outer ends are adapted to be engaged by the circular wedge 60, which slides on the spindle. Secured to the forward end of the spindle is a chuck-cap 61, Fig. 5. The sliding wedge on the spindle is moved backwardly and forwardly at the proper times by an arm 62, that projects upwardly from a slide 63, which is reciprocated on the frame by the engagement of cams on the cam-drum 65 with a roll 64 on the bottom of the slide, Fig. 1. As the spindles are revolved the grooves 66 in the wedge-blocks in turn as they reach a lower position receive the arm projecting upwardly from the slide. The backward movement of the circular wedge spreads the levers and causes them to force the chucking tube and jaws forwardly against the tapering interior of the chuck-cap. This closes the jaws and causes them to grasp and hold the rod that extends through the feed-tube of that spindle. When the rod is gripped, the feed-tube is drawn backwardly by an arm 67, projecting upwardly from a slide 68, which is reciprocated on the frame by the engagement of cams on the cam-drum with a roll 69 on the bottom of the slide. While the spindles revolve, the feed-tubes are guided and held against longitudinal movement, except when in their lower position, by the engagement of the flanged collars 53 on their rear ends with the walls of the ring 70, that is fastened to the top of the bed, Fig. 1. Each flanged collar when in a lower position passes from the ring onto the upper end of the arm 67, and then the slide is moved forward by a cam on the drum. After the feed-tube has been drawn back to get a length of rod the chucking-jaws are drawn backwardly, so as to release the grip of the jaws. The feed-tube is advanced to feed the rod forwardly when the chuck-jaws are open. When a sufficient amount of rod has been fed, the chucking-jaws are caused to grip and hold the rod while the spindle makes a complete revolution with the spindle-head and presents the rod to all of the tools.

Splined upon each spindle is a sleeve 71. Loosely mounted on one end of this sleeve is a gear 72, which meshes with a gear 73, that is keyed to a shaft 95, that extends centrally of the machine and is provided with a driving-pulley 74, that by a suitable belt is rotated in one direction. Loosely mounted on the other end of the sleeve is a gear 75, that meshes with a gear 76, that is keyed to a sleeve 77 through which the shaft extends. On this sleeve is a pulley 78, which by a suitable belt is rotated in a reverse direction, so that the shaft will rotate in one direction and the sleeve will rotate in the opposite direction, Fig. 5.

Mounted on the sleeve that is splined to each spindle and keyed so as to rotate with it is a male clutch part 79, one end of which is adapted to make frictional engagement with the interior of the female clutch part 80 in one of the gears that runs loosely on the sleeve, while the other end of which is provided with a block 81, which is adapted to positively engage with a stud 82, projecting from the other gear that runs loosely on the sleeve, Fig. 5. When the clutch is in frictional engagement with one gear, the spindle is rotated rapidly in one direction. When the clutch is positively engaged with the other gear, the spindle is rotated at a less rate of speed in the opposite direction. The clutch-block is forced so as to be normally in frictional engagement with one of the gears by springs 83, that thrust between a washer 84 on the sleeve and the face of the block. At the proper time the clutch-block is moved backwardly, so as to release its frictional grip with this gear and to engage positively with the stud projecting from the other gear by means of a shoe 85, which is held by the upper end of a lever 86, pivotally supported by the frame. The lower end of this lever is provided with a stud and roll, which is adapted to be engaged by a cam suitably mounted on the cam-drum, Figs. 3 and 5. This cam is arranged in such position that the friction-clutch is released, and the positive drive is engaged at the time the threading-tool is moved up for threading the end of the rod held by the spindle. After the thread has been cut the positive drive is released and the friction-drive is engaged, so as to rotate the rod in the opposite direction as the threading-tool is withdrawn.

Mounted so that it may be moved longitudinally on the top of the frame is a head 87, carrying the reducing-tools, which operate to form the body of the screw. This head is mounted on a slide 88, movable in a way in the top of the frame, and is provided with a stud and roll 89, that extend downwardly through the frame into the path of suitably-timed cams on the cam-cylinder 90, which is mounted on the cam-shaft. This head may be provided with one or more reducing-tools, a threading-die holder for causing the threading of the rods, and a holder for a box-tool, which may be used for turning down the rods, Figs. 1 and 4.

On the cam-shaft is a worm-wheel 91, which is engaged by a worm 92, that is mounted on a shaft 93, provided with a pulley 94, which may be belted to any counter-shaft for driving the cam-shaft at the desired rate of speed, Figs. 1 and 4.

A rod of metal of the desired diameter and length is thrust into each spindle as it nears the lowest point during its revolution with the head. At this point each chuck is opened by the chuck-opening cam on the main cam-cylinder, and while the chuck is opened the feed-cam on the cam-cylinder feeds the rod forward the required distance. After the rod has been fed the chuck is closed by the action of the chuck-closing cam, so that the rod will rotate with the spindle. At the proper time the head bearing the spindles is released by the withdrawal of the locking-bolt and when released is given a rotary movement by the pull of the rotating finger. Each spindle is rotated forwardly all of the time during its revolution with the head except when opposite the threading-die. The forward rotation is given by the gear on the sleeve on the central driving-shaft that meshes with the gear that is connected with each spindle by a friction-clutch, and the reverse rotation is given by the gear on the driving-shaft that meshes with the gear that is connected with each spindle by a positive clutch. Each clutch is shifted at the proper time by a lever and cam on the cam-cylinder. The cutting and forming tools that operate on the periphery of the rods and which are carried by slides movable on the face of the tool-head are moved simultaneously toward and from the axes of the several spindles for operating on the rods by the oscillations of the annular plate that is supported by the tool-head, the plate and the slides being connected by toggles and links. This causes the tools to be moved coincidently toward the several pieces of rod and uniformly on each piece. After passing the threading position each rod has the end that has been operated upon by the forming-tools cut off. The threading-die and tools that are carried by the threading-die head are moved together longitudinally on the bed of the machine by suitable cams, so as to operate against the ends of the rods and produce the desired cuts. While the threading-die is operating, the other tools carried by the same head are cutting, and the cutting and forming tools are also operated. In this machine the rods rotate forwardly with the spindles while all of the operations are being performed except the threading, the threading being performed by a backward rotation of the rods given when they are opposite the threading-die.

The invention claimed is—

1. In a screw-machine, a plural number of spindles, mechanism for feeding rods through the spindles, mechanism for revolving the spindles about the axis of the machine, mechanism for rotating the spindles on their own axes, cutting and forming tools movable toward and from the axes of the spindles, a head adjacent to the ends of the spindles, a plate movably supported by the head adjacent to the ends of the spindles, means connecting the plate with each of the cutting and forming tools whereby the several tools are fed simultaneously toward the axes of the spindles by the movement of the plate, and mechanism for moving the plate, substantially as specified.

2. In a screw-machine, a plural number of spindles, mechanism for feeding rods through the spindles, mechanism for revolving the spindles about the axis of the machine, mechanism for rotating the spindles on their own axes, cutting and forming tools movable toward and from the axes of the spindles, a head adjacent to the ends of the spindles, a plate movably supported by the head adjacent to the ends of the spindles, a variable-feed means connecting the plate with each of the cutting and forming tools whereby the several tools are fed simultaneously with a decreasing speed toward the axes of the spindles by the movement of the plate, and mechanism for moving the plate, substantially as specified.

3. In a screw-machine, a plural number of spindles, mechanism for feeding rods through the spindles, mechanism for revolving the spindles about the axis of the machine, mechanism for rotating the spindles on their own axes, cutting and forming tools movable toward and from the axes of the spindles, a head adjacent to the ends of the spindles, a plate movably supported by the head adjacent to the ends of the spindles, means connecting the plate with each of the cutting and forming tools whereby the several tools are fed simultaneously toward the axes of the spindles by the movement of the plate, mechanism for moving the plate, threading and cutting tools movable toward the ends of the spindles, and mechanism for feeding the threading and cutting tools toward the ends of the spindles contemporaneously with the movement of the plate, substantially as specified.

4. In a screw-machine, a plural number of spindles, mechanism for feeding rods through the spindles, mechanism for revolving the spindles about the axis of the machine, mechanism for rotating the spindles on their own axes, a head adjacent to the ends of the spindles and supporting cutting and forming tools, an annular plate supported by the head, mechanism for oscillating the annular plate, and mechanism connected with the annular plate for feeding the several tools simultaneously toward the axes of the spindles, substantially as specified.

5. In a screw-machine, a plural number of spindles, mechanism for feeding rods through the spindles, mechanism for revolving the spindles about the axis of the machine, mechanism for rotating the spindles on their own axes, a head supporting cutting and forming tools, an annular plate supported by the head, toggles connecting the head and cutting and forming tools, links connecting the plate and the toggles, and mechanism for oscillating the plate and feeding the several tools simultaneously toward the axes of the spindles, substantially as specified.

6. In a screw-machine, a plural number of spindles, mechanism for feeding rods through the spindles, mechanism for revolving the spindles about the axis of the machine, mechanism for rotating the spindles on their own axes, a head supporting cutting and forming tools, an annular plate supported by the head, toggles connecting the head and the cutting and forming tools, links connecting the plate and the toggles, an arm extending from the plate, and cams adapted to engage the arm for oscillating the plate and feeding the several tools simultaneously toward and from the axes of the spindles, substantially as specified.

7. In a screw-machine, a plural number of spindles, mechanism for feeding rods through the spindles, mechanism for revolving the spindles about the axis of the machine, mechanism for rotating the spindles on their own axes, a head supporting cutting and forming tools, an annular plate supported by the head, adjustable blocks supported by the head, toggle-links connected with the cutting and forming tools and with the adjustable blocks, links connecting the annular plate and the toggles, and mechanism for oscillating the plate and feeding the several tools simultaneously toward the axes of the spindles, substantially as specified.

8. In a screw-machine, a plural number of spindles, mechanism for feeding rods through the spindles, mechanism for rotating the spindles, a rotatable head supporting the spindles, mechanism for intermittently rotating the head, mechanism for stopping and locating the head, cutting and forming tools movable toward and from the axes of the spindles, a fixed head adjacent to the ends of the spindles, a plate movably supported by the fixed head, means connecting the plate with each of the cutting and forming tools whereby the several tools are fed simultaneously toward the axes of the spindles by the movement of the plate, and mechanism for moving the plate, substantially as specified.

9. In a screw-machine, a plural number of spindles, mechanism for feeding rods through the spindles, mechanism for rotating the spindles on their own axes, a clutch mounted on each spindle, mechanism common to all the spindles for rotating the spindles normally connected by the clutches with the spindles, mechanism for reversing the rotation of the spindles when they reach a certain position adapted to be connected with the spindles by the clutch, mechanism for shifting the clutches, threading and cutting tools movable toward the ends of the spindles, and mechanism for feeding the threading and cutting tools toward the ends of the spindles, substantially as specified.

10. In a screw-machine, a plural number of tubular spindles, two gears loosely mounted upon each spindle, a clutch keyed to each spindle between the gears, a central driving-shaft, a gear mounted on the driving-shaft and meshing with one gear on each spindle, a driving-sleeve mounted on the shaft, a gear mounted on the driving-sleeve and meshing with the other gear on each spindle, and mechanism for moving the clutch for connecting one or the other of the gears with each spindle, substantially as specified.

11. A spindle-rotating mechanism for a screw-machine having a tubular spindle, a pair of gears loosely mounted on the spindle, a clutch keyed to the spindle between the gears, a driving-shaft bearing a gear in mesh with one of the spindle-gears, a driving-sleeve mounted on the shaft and bearing a gear in mesh with the other spindle-gear, springs normally causing the clutch to frictionally engage one gear, and a shoe, lever and cam adapted to cause the clutch to positively engage the other spindle-gear, substantially as specified.

12. In a screw-machine a head supporting a plural number of spindles, a longitudinally-adjustable tool-head adjacent to the spindle-head, tool-slides movable in and out of the face of the tool-head, an annular plate supported by the tool-head adjacent to the slides, mechanism for oscillating the annular plate, and mechanism mounted on the annular plate for reciprocating the slides simultaneously, substantially as specified.

13. In a screw-machine, a head supporting a plural number of spindles, a longitudinally-adjustable tool-head adjacent to the spindle-head, tool-slides movable in and out on the face of the tool-head, an annular plate adjacent to the slides, a cam for oscillating the plate, toggles connecting the slides and the head, and a link connecting the plate and the toggles, substantially as specified.

14. In a screw-machine a tubular spindle, two gears loosely mounted on the spindle, a clutch keyed to the spindle between the gears, two independently-rotated driving-shafts having their axes alined adapted to turn in opposite directions, a gear mounted on one driving-shaft and meshing with one gear on the spindle, a gear mounted on the other driving-shaft and meshing with the other gear on the spindle, and mechanism for moving the clutch for connecting one or the other of the gears with the spindle, substantially as specified.

15. In a screw-machine a number of revoluble tubular spindles, a central driving-shaft adapted to rotate all of the spindles in one direction, a driving-shaft having its axis alined with the axis of the other driving-shaft, adapted to rotate all of the spindles in the opposite direction, gearing connecting the driving-shafts with the spindles, and a clutch connected with each spindle and adapted to connect each spindle with either of the driving-gearing, substantially as specified.

CHRISTOPHER M. SPENCER.

Witnesses:
ETHEL M. LOWE,
HARRY R. WILLIAMS.